United States Patent [19]

Perahia

[11] 4,063,293
[45] Dec. 13, 1977

[54] MAGNETIC HEAD SWITCHING MATRIX WITH BI-DIRECTIONAL CURRENT CAPABILITY

[75] Inventor: Avraham Perahia, Sharon, Mass.

[73] Assignee: Sperry Rand Corporation, New York, N.Y.

[21] Appl. No.: 677,957

[22] Filed: Apr. 19, 1976

[51] Int. Cl.² ............................................. G11B 15/12
[52] U.S. Cl. ........................................ 360/62; 360/63
[58] Field of Search ......................... 360/62, 63, 68, 61

[56] References Cited

U.S. PATENT DOCUMENTS

| | | | |
|---|---|---|---|
| 3,248,717 | 4/1966 | Mayhew | 360/62 |
| 3,453,612 | 7/1969 | Poumakis | 360/62 |
| 3,810,135 | 5/1974 | Kawakami | 360/62 |
| 3,930,266 | 12/1975 | Okamoto | 360/62 |

*Primary Examiner*—Jay P. Lucas
*Attorney, Agent, or Firm*—Howard P. Terry; Albert B. Cooper

[57] ABSTRACT

A magnetic head switching matrix selectively couples a plurality of balanced read-write heads to the output of a write amplifier and to the input of a read amplifier. Constant current supplies apply equal constant currents to a pair of write data lines connected to the write amplifier output and two further constant current supplies apply equal constant currents to two read data lines connected to the read amplifier input. The two coils of each head are coupled to the write data lines through two matched diodes respectively and are similarly coupled to the read data lines through another pair of matched diodes respectively. The center tap of each head is coupled to write and read reference voltage sources through respective diodes as well as being coupled to a read-write control voltage source. A head write selection current supply applies a selection current to the center tap of a selected head for writing purposes and a head read selection current supply applies a current to the center tap of a selected head for reading purposes.

17 Claims, 1 Drawing Figure

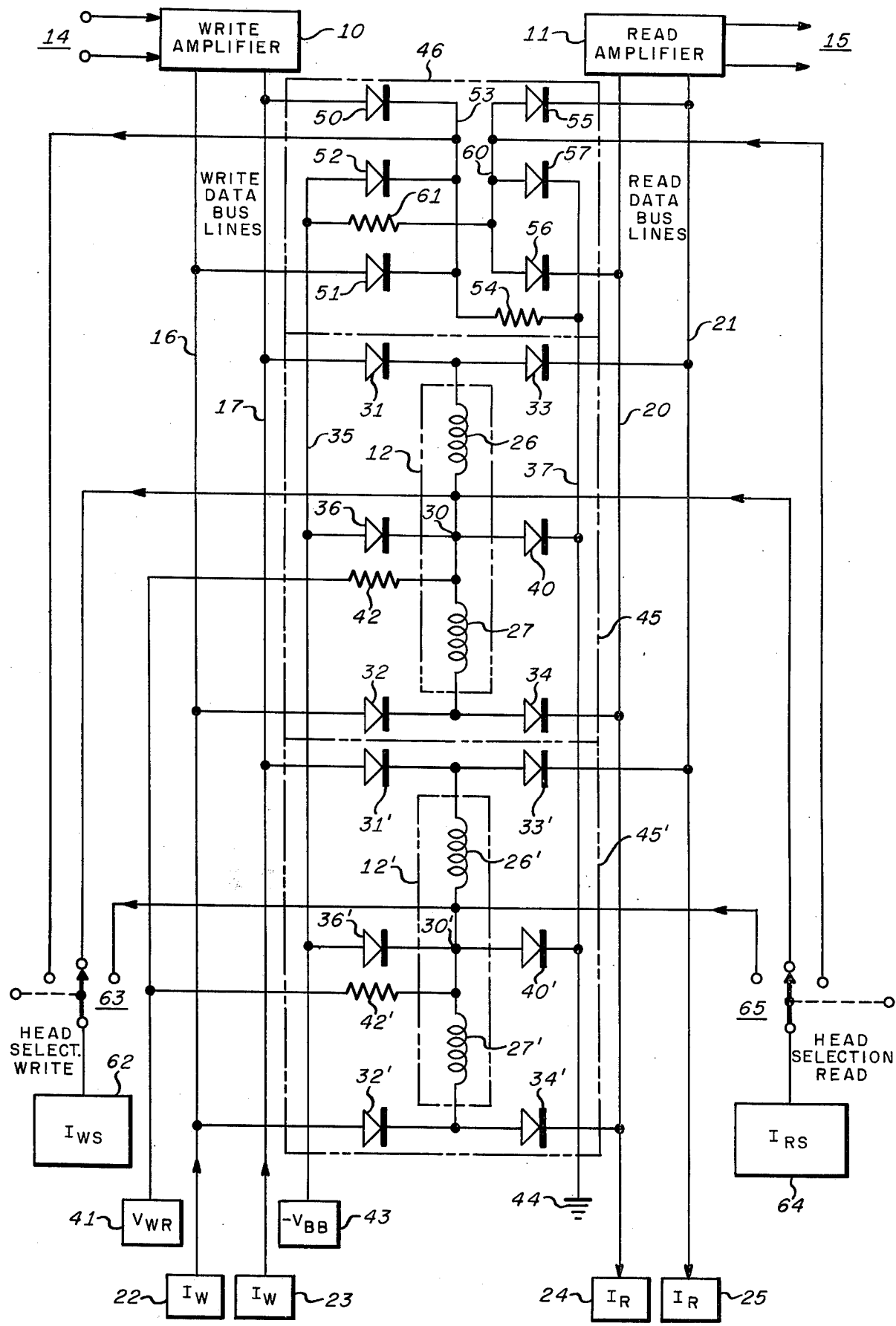

MAGNETIC HEAD SWITCHING MATRIX WITH BI-DIRECTIONAL CURRENT CAPABILITY

BACKGROUND OF THE INVENTION

1. Field of the Invention

The invention relates to the field of magnetic head switching matrices, particularly with regard to providing bi-directional current capabilities.

2. Description of the Prior Art

In the prior art multiple head digital magnetic storage systems such as discs, drums and the like utilized head switching matrices configured to handle the uni-directional currents required for the recording process. In such systems generally a uni-directional current pulse was directed into one side of the head or the other in order to record the desired binary flux states. However, in systems such as that disclosed in Applicant's assignee's patent application Ser. No. 483,340, filed June 26, 1974 in the names of R. Price and J. W. Craig, (now U.S. Pat. No. 3,940,694) as well as in other systems, it is required that bi-directional currents be applied selectively through the matrix to the heads. For example, high density magnetic recording systems with improved signal to noise ratio may require head switching matrices that have the capability of handling the bi-directional currents. The prior art head switching matrix configurations that were designed for handling uni-directional currents are unsuitable for the applications requiring bi-directional current switching.

In addition to the necessity of effectively handling the bi-directional currents, it is desirable that the head switching matrix operates with low noise and at a high speed to satisfy present day digital data storage requirements.

SUMMARY OF THE INVENTION

The present invention provides a high speed, low noise head switching matrix capable of handling bi-directional currents. The matrix couples amplifier means to a plurality of magnetic head, each head including two serially connected coils with a center tap therebetween. A pair of data lines is coupled to the amplifier means with two constant current supplies applying substantially equal constant currents to the lines. The two coils of each head are coupled to the data lines through respective diodes and a reference voltage source is coupled to the center tap of each head via additional doides. A control voltage source is also coupled to the center tap of each head. In order to select a head, a head selection current is applied to the center tap of the selected head so that substantially equal currents flow through the diodes coupling the selected head to the data lines. The reference and control voltages are such as to reverse bias the diodes associated with the non-selected head.

BRIEF DESCRIPTION OF THE DRAWING

The sole FIGURE is a schematic circuit diagram of a head switching matrix configured in accordance with the present invention.

DESCRIPTION OF THE PREFERRED EMBODIMENT

Referring to the sole FIGURE, a schematic circuit diagram of a head switching matrix configured in accordance with the present invention is illustrated. The matrix is utilized to connect the output of a write amplifier 10 and the input of a read amplifier 11 to a plurality of magnetic read-write heads, two of which being illustrated at 12 and 12'. The write amplifier 10 is of the conventional type utilized for providing signals to magnetic heads for recording data on the magnetic medium of the system. The amplifier 10 has an input 14 for receiving the signals to be recorded which preferably comprise bi-directional data signals as well as a high frequency bias signal for linearizing the medium. The read amplifier 11 is of the low noise high gain, a.c. coupled type utilized for providing data signals read from the medium by the magnetic heads 12 and 12', the data signals being provided at an output 15 of the read amplifier 11.

The output terminals from the write amplifier 10 are connected respectively to write data bus lines 16 and 17 and the input terminals to the read amplifier 11 are connected respectively to read data bus lines 20 and 21. Constant current supplies 22 and 23 inject equal constant currents $I_W$ into the write data bus lines 16 and 17 respectively and constant current supplies 24 and 25 draw equal constant currents $I_R$ from the read data bus lines 20 and 21 respectively. The constant currents $I_W$ provided by the supplies 22 and 23 are equal to each other and are maintained constant throughout the head selection and read-write modes of the matrix. Similarly, the constant currents $I_R$ provided by the supplies 24 and 25 are equal to each other and are maintained constant during the various operating modes of the matrix. The current $I_W$ is selected to be equal to or greater than the peak current expected from the write amplifier 10. The current $I_R$ is selected at a few tens of milliamperes to minimize noise. $I_R$ is generally selected to maintain a value between 10 and 50 milliamperes.

Although the elements 22–25 have been generically described as current supplies, it will be appreciated that in the specific embodiment illustrated the elements 22 and 23 are specifically selected as current sources whereas the elements 24 and 25 are specifically selected as current sinks.

As previously described, the matrix selects one of a plurality of magnetic heads for reading or writing, two of the heads being illustrated at 12 and 12'. Each of the heads, such as the head 12, is a balanced head comprising two serially connected coils 26 and 27 with a center tap 30 therebetween. The ends of the coils 26 and 27 are connected to the write data bus lines 17 and 16 through diodes 31 and 32 respectively. The ends of the coils 26 and 27 are also connected to the read data bus lines 21 and 20 through diodes 33 and 34 respectively. The center tap 30 of the head 12 is connected to a write reference voltage bus 35 through a diode 36 and to a read reference voltage bus 37 through a diode 40. The diode 31–34, 36 and 40 are selected to have high forward conductance and low reverse capacitance. The diodes 31, 32 and 36 are matched to each other with respect to forward voltage drop as are the diodes 33, 34 and 40. The center tap 30 of the head 12 is coupled to a control voltage source 41 through a resistor 42. The voltage source 41 provides a voltage $V_{WR}$ in accordance with whether the selected head is being utilized for reading or writing.

The write reference voltage bus 35 and the read reference voltage bus 37 are connected to a write reference voltage source 43 and a read reference voltage source 44 respectively. The write reference voltage source 43 provides a voltage $-V_{BB}$ where the magnitude of $V_{BB}$ is selected to be one volt greater than that of the largest peak voltage of the signal from the write amplifier 10. The read reference voltage source 44 may for convenience be selected as ground potential.

The cmponents of the matrix associated with the head 12 and within the dotted box 45 are repeated for each of the magnetic heads of the system. For example, the portion 45' of the matrix is identical to the portion 45 where the corresponding components are indicated by primed reference numerals with respect to the components of the portion 45.

As previously described, each of the heads has associated therewith a set of diode switches for selevtively connecting the write amplifier 10 and the read amplifier 11 thereto. The matrix also includes an additional set of diode switches 46 which functions as a "dummy" head. The dummy head 46 comprises diodes 50, 51 and 52 connected between a junction 53 and the write data bus lines 17 and 16 and the write reference voltage bus line 35 respectively. The junction 53 is coupled to the read reference voltage bus line 37 via a resistor 54. The dummy head 46 further comprises diodes 55, 56 and 57 connecting a junction 60 to the read data bus lines 21 and 20 and the read reference voltage bus line 37 respectively. The junction 60 is coupled to the write reference voltage bus line 35 via a resistor 61. The diodes of the dummy head 46 are of the high forward conductance and low reverse capacitance type where the diodes 50-52 are matched with respect to each other for forward voltage drop as are the diodes 55-57.

Head selection for writing purposes is accomplished by means of a write head selection current supply 62 which is coupled by means of a switch 63 to the center tap of the head to be selected for writing. When the matrix is in the read mode the switch 63 is positioned to connect the current source 62 to the junction 53 of the dummy head 46. In the specific embodiment illustrated, the supply 62 is selected as a current sink that draws a current $I_{WS}$ out of the center tap of the head to which it is connected where $$I_{WS} \approx 3 I_W + \Delta I_R$$

where $\Delta I_R$ is the current drawn through the resistor associated with the head selected by the current sink 62. The switch 63 is positioned to the head to be selected for writing or to the dummy head by conventional selection means not shown.

In a similar manner, head selection for reading purposes is accomplished by a read head selection current supply 64 which is connected to the center tap of the select head by a switch 65, or is connected to the junction 60 of the dummy head 46 when the matrix is in the write mode. In the embodiment illustrated the supply 64 is selected as a current source that injects a current $I_{RS}$ into the selected head where $$I_{RS} \approx 3 I_R + \Delta I_R$$

where $\Delta I_R$ is the current injected through the resistor associated with the head selected by the current source 64. The switch 65 is positioned to the selected head or to the dummy head 46 by conventional selection means not shown.

Although the switches 63 and 65 are illustrated as mechanical switches with mechanical selection means, it will be appreciated that in a practical embodiment of the invention conventional transistor or diode switching with conventional selection circuitry will be utilized.

In the operation of the matrix in the read mode it will be assumed that the head 12 is selected for reading purposes with the head 12' and all of the remaining heads (not shown) being non-selected. In the read mode the voltage $V_{WR}$ provided by the control voltage source 41 must be more positive than $-V_{BB}$. In order to minimize noise contributed to the read signal by the switching matrix, $V_{WR}$ is set as close to $-V_{BB}$ as possible for reliable operation. Thus for reading, $V_{WR}$ is set approximately equal to $-V_{BB} + 1$ volt.

As previously described, with the matrix in the read mode the switch 63 is positioned to connect the write head selection current sink 62 to the junction 53 of the dummy head 46. Since $I_{WS}$ is approximately equal to 3 $I_W + \Delta I_R$, the current sink 62 draws a current of $I_W$ from each of the constant current sources 22 and 23 through the write data bus lines 16 and 17, through the diodes 51 and 50, through the junction 53 and then back to the current sink 62. Thus a current of 2 $I_W$ is contributed from the sources 22 and 23. The valve of the resistor 54 is selected such that the sink 62 will draw $\Delta I_R$ from ground 44 through the resistor 54 and hence through the junction 53. Thus, since the current sink 62 draws a current of 3 $I_W + \Delta I_R$ and 2 $I_W$ are contributed by the sources 22 and 23 and $\Delta I_R$ is contributed through the resistor 54, the sink 62 draws a current of $I_W$ through the diode 52 from the $-V_{BB}$ voltage source 43. Since the diodes 50, 51 and 52 are all forward biased by the same current $I_W$, and the diodes are matched for forward voltage drop and since the anode of the diode 52 is connected to the $-V_{BB}$ supply 43, the anodes of the diodes 50 and 51 are also at a voltage of $-V_{BB}$. Therefore, when the matrix is in the read mode, the write data bus lines 16 and 17 are maintained at a voltage of $-V_{BB}$. Hence the write data bus lines 16 and 17 are shorted to the $-V_{BB}$ voltage supply 43 through the small impedance of two high conductance forward biased diodes. Consequently, the output of the write amplifier 10 is shorted to a.c. ground and any noise or feed through signal appearing at its output will not interfere with the read signal.

With the matrix in the read mode, the diodes 31, 32 and 36 of the selected head 12 are maintained reverse biased as are the diodes 31', 32' and 36' of all of the non-selected heads. This is so since the anodes of these diodes are connected to the write data bus lines 16 and 17 which are maintained at $+V_{BB}$ as described and the cathodes of the diodes are maintained at $-V_{BB} + 1$ volt from the $V_{WR}$ supply 41.

With the head switching matrix in the read mode and the head 12 selected, the switch 65 is positioned to connect the read head selection current source 64 to the center tap 30 of the selected head 12. Thus a current of 3 $I_R + \Delta I_R$ is injected into the head 12 to forward bias the diodes 33, 34 and 40. A current of $I_R$ flows through the coil 26, the diode 33, the read data bus line 21 to the current sink 25. An additional current $I_R$ flows through the coil 27, the diode 34, the read data bus line 20 and to the current sink 24. The value of the resistor 42 is selected such that a current of $\Delta I_R$ flows therethrough to the voltage source 41. Thus the remaining $I_R$ flows through the diode 40 to ground through the voltage bus 37. Since the diodes 33, 34 and 40 are matched for forward voltage drop and are forward biased by the same current $I_R$, the voltages at the cathodes of these diodes are substantially the same (neglecting the low d.c. resistance of the head 12) so that the read data bus lines 20 and 21 are referenced to substantially ground potential. Since the currents $I_R$ flow through the coils 26 and 27 in opposite directions, these currents do not result in any significant magnetization in the head 12. The total additional resistance introduced in series with each half of the head windings is that of two forward biased high conductance diodes which is on the order of a few ohms and therefore compatible with the noise figure of the low noise read amplifier 11.

The diodes 33', 34' and 40' associated with the non-selected head 12' as well as the corresponding diodes of the remaining non-selected heads of the system are reverse biased since the anodes of these diodes are maintained at $-V_{BB} + 1$ volt from the $V_{WR}$ voltage source 41 while the cathodes of the diodes are maintained at ground potential. The reverse bias on the diodes 33', 34' and 40' of the non-selected heads is maintained as large as possible in order to minimize the reverse capacitance of the diodes to the extent possible. The reasons for minimizing capacitance associated with the non-selected heads are well appreciated in the art.

To change the selected head in the read mode the switch 65 is operated to connect the current source 64 from the previously selected head to the newly selected head. Thus the selection current $I_{RS}$ is shifted from one head to the other in order to effect the selection. For example, consider the head selection being switched from the head 12 to the head 12'. When the switch 65 shifts the selection current $I_{RS}$ from the head 12 to the head 12', the diodes 33, 34 and 40 are turned off and the head 12 is pulled up to $-V_{BB} + 1$ volt through the resistor 42 by the $V_{WR}$ voltage supply 41. The diodes 33', 34' and 40' are turned on by pulling the head 12' to ground potential by the current $I_{RS}$. Since all of the diode triplets are matched, the switching from one head to another (including the dummy head 46), does not change the d.c. voltage level at the read data bus lines 20 and 21, eliminating any long recovery time usually caused by a d.c. shift at the input of a high gain a.c. coupled amplifier such as the read amplifier 11. Additionally, since no magnetic field existed in the previously selected head and no field is created at the newly selected head (except for small leakage fields) transient times normally required in prior art arrangements for current build up and decay are considerably reduced. Furthermore, power supply transients are eliminated since currents are shifted rather than switched on and off as in prior art arrangements.

In the operation of the matrix in the write mode it will be assumed that the head 12 is selected for writing purposes with the head 12' and all of the remaining heads (not shown) being non-selected. In the write mode the voltage $V_{WR}$ provided by the control voltage source 41 must be less than zero. With the selection of $-V_{BB}$ as described above, $V_{WR}$ is set as close to ground as possible for reliable operation so that the write signals from the amplifier 10 on the lines 16 and 17 do not forward bias the diodes 31', 32' and 36' of the non-selected head 12' as well as the corresponding diodes of the remaining non-selected heads. Thus for writing, $V_{WR}$ is set approximately equal to $-1$ volt.

As previously described, with the matrix in the write mode the switch 65 is positioned to connect the read head selection current source 64 to the junction 60 of the dummy head 46. Since $I_{RS}$ is approximately equal to $3 I_R + \Delta I_R$, the current source 64 injects a current of $I_R$ into each of the constant current sinks 24 and 25 through the junction 60, through the diodes 56 and 55, through the read data bus lines 20 and 21 and then to the current sinks 24 and 25 respectively. Thus a current of $2 I_R$ is contributed to the sinks 24 and 25. The value of the resistor 61 is selected such that the source 64 injects $\Delta I_R$ through the junction 60, through the resistor 61 and into the write reference voltage source 43. Thus since the current source 64 provides a current of $3 I_R + \Delta I_R$ and $2 I_R$ are contributed to the sinks 24 and 25 $\Delta I_R$ is contributed to the voltage source 43, the source 64 injects a current of $I_R$ through the diode 57 to ground. Since the diodes 55, 56 and 57 are all forward biased by the same current $I_R$, and the diodes are matched for forward voltage drop and since the cathode of the diode 57 is connected to ground 44, the cathodes of the diodes 55 and 56 are also at ground potential. Therefore, when the matrix is in the write mode, the read data bus lines 20 and 21 are shorted to ground potential. Thus, the input to the high gain a.c. coupled read amplifier 11 is grounded eliminating deep amplifier saturation caused by signals that are radiated or capacitively coupled during the write operations of the matrix. This tends to reduce the write-read transition time compared to prior art arrangements. Additionally, since the read data bus lines 20 and 21 are at a d.c. level of ground potential in the read mode and are also shorted to ground potential during the write mode, the input to the read amplifier 11 does not change d.c. voltage level when switching modes thereby eliminating long recovery times usually experienced by d.c. shifts at the input of the high gain a.c. coupled read amplifiers of prior art systems.

With the matrix in the write mode, the diodes 33, 34 and 40 of the selected head 12 are maintained reverse biased as are the diodes 33', 34' and 40' of all of the non-selected heads. This is so since the cathodes of these diodes are connected to the read data bus lines 20 and 21 which are maintained at ground potential as described and the anodes of these diodes are maintained at $-1$ volt from the $V_{WR}$ supply 41.

With the head switching matrix in the write mode and the head 12 selected, the switch 63 is positioned to connect the write head selection current sink 62 to the center tap 30 of the selected head 12. Thus a current of $3 I_W + \Delta I_R$ is drawn through the head 12 to forward bias the diodes 31, 32 and 36. A current of $I_W$ flows from the sink 23 through the write data bus line 17, the diode 31, the coil 26 to the current sink 62. An additional current $I_W$ flows from the current source 22 through the write data bus line 16, through the diode 32, through the coil 27 to the current sink 62. The value of the resistor 42 is such that a current of $\Delta I_R$ is drawn therethrough from the voltage soruce 41. Thus the remaining $I_W$ is drawn through the diode 36 via the voltage bus 35 from the $-V_{BB}$ voltage source 43. Since the diodes 31, 32 and 36 are matched for forward voltage drop and are forward biased by the same current $I_W$, the voltages at the anodes of these diodes are substantially the same (neglecting the low d.c. resistance of the head 12) so that the write data bus lines 16 and 17 are referenced to substantially at the $-V_{BB}$ potential of the source 43. Since the currents $I_W$ flow through the coils 26 and 27 in opposite directions, these currents do not result in any effective magnetization in the head 12.

Since the write data bus lines 16 and 17 are at a d.c. level of $-V_{BB}$ in the read mode as well as in the write mode, no voltage changes occur at the lines 16 and 17 and consequently no significant current transients occur and consequently current decay and buildup times are considerably reduced compared to prior art arrangements.

The diodes 31', 32' and 36' associated with the non-selected head 12' as well as the corresponding diodes of the remaining non-selected heads of the system are reverse biased since the cathodes of these diodes are maintained at −1 volt from the $V_{WR}$ voltage source 41 while the anodes of the diodes are maintained at $-V_{BB}$. Since the magnitude of $-V_{BB}$ was selected to be 1 volt larger than any expected peak voltage signal from the write amplifier 10, all of the diodes connected to non-selected heads from the write data bus lines 16 and 17 will remain reverse biased irrespective of the signals provided from the amplifier 10. Additionally, since each of the diodes 31 and 32 in the selected head 12 are forward biased by a current $I_W$, bi-directional currents provided by the write amplifier 10 whose peaks are below $I_W$ are properly handled by the matrix.

To change the selected head in the write mode the switch 63 is operated to connect the current sink 62 from the previously selected head to the newly selected head. Thus the selection current $I_{WS}$ is shifted from one head to the other in order to effect the selection. For example, consider the head selection being switched from the head 12 to the head 12'. When the switch 63 shifts the selection current $I_{WS}$ from the head 12 to the head 12', the diodes 31, 32 and 36 are turned off and the head 12 is pulled up to −1 volt through the resistor 42 by the $V_{WR}$ voltage supply 41. The diodes 31', 32' and 36' are turned on by pulling the head 12' to $-V_{BB}$ with the current $\Delta I_R$ being carried now through the resistor 42'. Since all of the diode triplets are matched, the switching from one head to another (including the dummy head 46), does not change the d.c. voltage level at the write data bus lines 16 and 17 eliminating current transients and the time required for current decay and buildup. Additionally, since no magnetic field existed in the previously selected head and no field is created at the newly selected head (except for small leakage field) transient times normally required in prior art arrangements for current buildup and decay are again considerably reduced. Furthermore, power supply transients are eliminated since currents are shifted rather than switched on and off as in prior art arrangements.

Thus, it will be appreciated that the head switching matrix described above has the capability of handling bi-directional signals and utilizes high conductance forward d.c. biased diodes to provide a low noise contribution in the playback or read mode. The switching process is completely balanced providing almost no change in overall current and voltage levels which consequently permits a significantly faster switching speed compared to prior art arrangements. Although a particular arrangement of voltages and current directions and diode polarities is described hereinabove and illustrated in the drawing, it will be appreciated that other voltage and current magnitudes and directions as well as diode polarities can be utilized in practicing the invention.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A switching circuit for selectively coupling amplifier means to a plurality of magnetic heads, each said head including two serially connected coils with a center tap therebetween, comprising first and second data line means coupled to said amplifier means, first and second constant current supply means coupled to said first and second data line means respectively for inducing substantially equal constant currents therein, first and second diode means associated with each said head coupling said two coils thereof to said first and second data line means respectively, reference voltage source means, third diode means associated with each said head coupling said center tap thereof to said reference voltage source means, control voltage source means coupled to said center tap of each said head, head selection current supply means for providing a head selection current to select a head, and head selection means for selectively coupling said head selection current to the center tap of said selected head whereby said substantially equal constant currents flow through said first and second diode means associated with said selected head, said reference voltage source means and said control voltage source means providing voltages for reverse biasing said diode means associated with the non-selected heads.

2. A switching circuit for a plurality of magnetic read-write heads for selectively coupling each said head to write amplifier means for applying bi-directional write currents thereto and for selectively coupling each said head to read amplifier means for receiving bi-directional read currents therefrom, each said head including two serially connected coils with a center tap therebetween, comprising first and second write data lines coupled to the output of said write amplifier means, first and second constant current supply means coupled to said first and second write data lines respectively for inducing substantially equal write constant currents therein, first and second diode means associated with each said head coupling said two coils thereof to said first and second write data lines respectively, first and second read data lines coupled to the input of said read amplifier means, third and fourth constant current supply means coupled to said first and second read data lines respectively for inducing substantially equal read constant currents therein, third and fourth diode means associated with each said head coupling said two coils thereof to said first and second read data lines respectively, write and read reference voltage source means, fifth and sixth diode means associated with each said head coupling said center tap thereof to said write and read reference voltage source means respectively, control voltage source means coupled to said center tap of each said head, write head selection current supply means for providing a write head selection current to select a head for writing, write head selection means for selectively coupling said write head selection current to the center tap of said selected head whereby said substantially equal write constant currents flow through said first and second diode means associated with said selected head, read head selection current supply means for providing a read head selection current to select a head for reading, read head selection means for selectively coupling said read head selection current to the center tap of said selected head whereby said substantially equal read constant currents flow through said third and fourth diode means associated with said selected head, said write and read reference voltage source means and said control voltage source means providing voltages for reverse biasing said diode means associated with the non-selected heads, for reverse biasing said third and fourth diode means of said selected head when said head is selected for writing and for reverse biasing said first and second diode means of said selected head when said head is selected for reading.

3. The switching circuit of claim 2 in which
said first and second diode means comprise diodes matched to each other with respect to forward voltage drop, and
said third and fourth diode means comprise diodes matched to each other with respect to forward voltage drop.

4. The switching circuit of claim 2 in which
said first, second and fifth diode means comprise diodes matched to each other with respect to forward voltage drop, and
said third, fourth and sixth diode means comprise diodes matched to each other with respect to forward voltage drop.

5. The switching circuit of claim 2 further including dummy head means comprising
first and second junctions,
seventh and eighth diode means coupling said first junction to said first and second write data lines respectively,
ninth and tenth diode means coupling said second junction to said first and second read data lines respectively,
eleventh diode means coupling said first junction to said write reference voltage source means, and
twelfth diode means coupling said second junction to said read reference voltage source means.

6. The switching circuit of claim 5 in which
said seventh, eighth and eleventh diode means comprise diodes matched to each other with respect to forward voltage drop, and
said ninth, tenth and twelfth diode means comprise diodes matched to each other with respect to forward voltage drop.

7. The switching circuit of claim 5 further including means for coupling said first and second junctions to said read and write reference voltage source means respectively.

8. The switching circuit of claim 5 in which
said write head selection means includes means for coupling said write head selection current to said first junction of said dummy head means when said selected head is selected for reading, and
said read head selection means includes means for coupling said read head selection current to said second junction of said dummy head means when said selected head is selected for writing.

9. The switching circuit of claim 2 in which said write reference voltage source provides a write reference voltage greater than the largest peak voltage provided by said write amplifier means.

10. The switching circuit of claim 2 in which said first and second constant current supply means comprise means for providing said write constant currents at least equal to the peak of said bi-directional write currents provided by said write amplifier means.

11. The switching circuit of claim 2 in which said read reference voltage source means comprises a source of ground potential.

12. The switching circuit of claim 2 in which said control voltage source means comprises means for providing said control voltage intermediate said write and read reference voltages.

13. The switching circuit of claim 12 in which said control voltage source means comprises means for providing said control voltage differing from said read reference voltage by approximately the forward voltage drop of said third diode means when said selected head is selected for writing.

14. The switching circuit of claim 12 in which said control voltage source means comprises means for providing said control voltage differing from said write reference voltage by approximately the forward voltage drop of said first diode means when said selected head is selected for reading.

15. The switching circuit of claim 2 in which said write head selection current supply means comprises means for providing said write head selection current approximately equal to three times said write constant current plus the current provided from said control voltage source means to said selected head.

16. The switching circuit of claim 2 in which said read head selection current supply means comprises means for providing said read head selection current approximately equal to three times said read constant current plus the current provided by said control voltage source means to said selected head.

17. The switching circuit of claim 2 in which all said diode means comprise low forward conductance diode means with low reverse capacitance.

* * * * *